(12) United States Patent
Matsueda (10) Patent No.: US 12,502,943 B2
(45) Date of Patent: Dec. 23, 2025

(54) BATTERY MOUNTING STRUCTURE OF FRAME VEHICLE

(71) Applicant: TOYOTA JIDOSHA KABUSHIKI KAISHA, Toyota (JP)

(72) Inventor: Koji Matsueda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 315 days.

(21) Appl. No.: 18/366,942

(22) Filed: Aug. 8, 2023

(65) Prior Publication Data

US 2024/0116350 A1 Apr. 11, 2024

(30) Foreign Application Priority Data

Oct. 11, 2022 (JP) ................................. 2022-162917

(51) Int. Cl.
*B60K 1/04* (2019.01)
*H01M 50/227* (2021.01)
(Continued)

(52) U.S. Cl.
CPC ............. *B60K 1/04* (2013.01); *H01M 50/227* (2021.01); *H01M 50/249* (2021.01);
(Continued)

(58) Field of Classification Search
CPC ............. B60K 1/04; B60K 2001/0438; H01M 50/227; H01M 50/249; H01M 50/264; H01M 2220/20; H01M 50/242; H01M 50/244; B60L 50/66; B60L 2270/145; B60L 50/71; B62D 21/09
See application file for complete search history.

(56) References Cited

U.S. PATENT DOCUMENTS

| 11,059,361 | B2 * | 7/2021 | Bohmer ................... B60L 50/64 |
| 11,548,363 | B2 * | 1/2023 | Kumagai ............... B62D 21/02 |
| 2021/0245811 | A1 * | 8/2021 | Murata ................. B60K 5/1216 |

FOREIGN PATENT DOCUMENTS

| CN | 114374040 A | * | 4/2022 | ........ H01M 10/6568 |
| CN | 114572308 A | * | 6/2022 | ............. B62D 21/09 |

(Continued)

OTHER PUBLICATIONS

CN-114374040-A English Translation (Year: 2022).*
(Continued)

*Primary Examiner* — Michael T. Walsh
(74) *Attorney, Agent, or Firm* — SoraIP, Inc.

(57) ABSTRACT

A battery mounting structure of a frame vehicle, which supports a battery pack by a pair of right and left side frames extending in the vehicle front-rear direction and provided in the frame vehicle, includes: a plurality of lateral members extending in the vehicle width direction and bridging the pair of right and left side frames; a longitudinal member supported by the plurality of lateral members so as to extend in the vehicle front-rear direction at an intermediate position of the side frames; and a support member that supports the battery pack such that a plurality of longitudinal members are provided at intervals in the vehicle front-rear direction and a gap in the vertical direction is generated between the plurality of longitudinal members. The battery pack is connected to the side frame via a rubber bush.

3 Claims, 11 Drawing Sheets

(51) Int. Cl.
*H01M 50/249* (2021.01)
*H01M 50/264* (2021.01)

(52) U.S. Cl.
CPC ... *H01M 50/264* (2021.01); *B60K 2001/0438* (2013.01); *H01M 2220/20* (2013.01)

(56) References Cited

FOREIGN PATENT DOCUMENTS

| | | | | | |
|---|---|---|---|---|---|
| CN | 114734804 | A | * | 7/2022 | ............. A62C 31/00 |
| CN | 114746326 | A | * | 7/2022 | ............... B60K 1/04 |
| JP | 2012-101589 | A | | 5/2012 | |
| JP | 2016113063 | A | * | 6/2016 | |
| JP | 2018118673 | A | * | 8/2018 | |
| JP | 2021011212 | A | * | 2/2021 | |
| SE | 543973 | C2 | * | 10/2021 | .............. B60L 50/66 |
| WO | WO-2019244858 | A1 | * | 12/2019 | .......... H01M 50/249 |

OTHER PUBLICATIONS

CN-114572308-A English Translation (Year: 2022).*
CN-114734804-A English Translation (Year: 2022).*
CN-114746326-A English Translation (Year: 2022).*
JP-2016113063-A English Translation (Year: 2016).*
JP-2018118673-A English Translation (Year: 2018).*
JP-2021011212-A English Translation (Year: 2021).*
SE-543973-C2 English Translation (Year: 2021).*
WO-2019244858-A1 English Translation (Year: 2019).*

* cited by examiner

BATTERY MOUNTING STRUCTURE OF FRAME VEHICLE

CROSS-REFERENCE TO RELATED APPLICATION

This application claims priority to Japanese Patent Application No. 2022-162917 filed on Oct. 11, 2022 incorporated herein by reference in its entirety.

BACKGROUND

1. Technical Field

The present disclosure relates to a mounting structure of a battery in an electrified vehicle, and more particularly, to a mounting structure of a battery in an electrified vehicle with a frame (hereinafter, also simply referred to as a "frame vehicle").

2. Description of Related Art

Conventionally, in an electrified vehicle driven by electric power supplied from a battery, a battery is generally mounted in such a manner that a battery pack in which a secondary battery such as a lithium-ion battery is systematized and stored in a case is supported by a pair of right and left side frames extending in a vehicle front-rear direction.

For example, Japanese Unexamined Patent Application Publication No. 2012-101589 (JP 2012-101589 A) discloses, in a so-called monocoque vehicle, a battery pack fixing structure of an electrified vehicle configured such that a bracket fixed to a housing (case) of a battery pack is fastened to a pair of right and left side frames extending in the vehicle front-rear direction to form a part of a skeleton of a vehicle body.

SUMMARY

By the way, as in JP 2012-101589 A, when the mounting structure for simply fastening the battery pack to the side frame is not applied to a monocoque vehicle but applied to a so-called frame vehicle in which a body (cabin) is mounted on a side frame via a cab mount or the like, there is a possibility that the following problems occur.

That is, unlike the monocoque vehicle in which the torsional rigidity of the side frame is relatively high due to integration of the side frame and the body, in the frame vehicle, the torsional rigidity of the side frame only is relatively low due to separation of the side frame and the body. Therefore, when the mounting structure in which the battery pack is simply fastened to the side frame is adopted in the frame vehicle, as in the monocoque vehicle, the battery pack fastened to the side frame is greatly twisted since the torsion angle of the side frame at the time of traveling (such as riding over a step) is large, which may result in a failure in the battery.

Here, in order to absorb the torsion of the side frame, it is considered that the battery pack is supported by the side frame via a rubber mount. However, a hard spring characteristic of several hundred N/mm is required in order to support a battery pack of several hundred kg, and in a rubber mount having such a hard spring characteristic, it is difficult to absorb the torsion (up and down displacement) of the side frame.

The present disclosure has been made in view of such a point. An object of the present disclosure is to provide a battery mounting structure capable of suppressing a failure of the battery even when the torsion angle of the side frame supporting the battery pack increases in the frame vehicle in which the side frames and the body are separated from each other.

In order to achieve the above object, in the battery mounting structure of the frame vehicle according to the present disclosure, the battery pack is supported by a longitudinal member provided at an intermediate position between the right and left side frames, which is most unlikely to be affected by the torsion angle of the right and left side frames.

Specifically, the present disclosure is directed to a battery mounting structure of a frame vehicle in which a battery pack is supported by a pair of right and left side frames that is provided in the frame vehicle and that extends in a vehicle front-rear direction.

The battery mounting structure includes:
- a plurality of lateral members extending in a vehicle width direction and extending across the right and left side frames;
- a longitudinal member supported by the lateral members so as to extend in the vehicle front-rear direction at an intermediate position between the right and left side frames in the vehicle width direction; and
- a plurality of support members that is provided on the longitudinal member at intervals in the vehicle front-rear direction and that supports the battery pack such that gaps in an up-down direction are provided between the lateral members and the battery pack, in which the battery pack is connected to the right and left side frames via a rubber bush.

In this configuration, the up and down displacement of the central portion of the lateral member, which is the intermediate position between the right and left side frames in the vehicle width direction, is the average value of the displacement of the right and left side frames. Therefore, even when the torsion angle of the side frame increases, almost no displacement occurs. Therefore, the longitudinal member supported by the lateral members so as to extend in the vehicle front-rear direction at the intermediate position of the right and left side frames in the vehicle width direction is hardly affected (no displacement occurs) even when the torsion angle of the side frame increases.

Thus, since the battery pack is supported by the support members provided on the longitudinal member, the battery pack is hardly affected even when the torsion angle of the side frame increases. In addition, since the support members support the battery pack such that the gaps in the up-down direction are provided between the lateral members and the battery pack, the battery pack is not affected even when the lateral members are greatly inclined, and the torsion angle of the side frame increases. Therefore, even when the torsion angle of the side frame increases, the battery pack is not significantly twisted. Accordingly, a failure of the battery can be suppressed.

When viewed in a cross section orthogonal to the vehicle front-rear direction, the battery pack is supported at one point at the intermediate position between the right and left side frames, and therefore, it is considered that the battery pack becomes unstable. However, since the battery pack is connected to the side frames via the rubber bush, the shaking of the battery pack can be restricted by the rubber bush.

In the battery mounting structure of the frame vehicle, each of the support members may be a bolt for fastening the longitudinal member and the battery pack.

As described above, since the battery pack is supported by the longitudinal member that is hardly affected even when the torsion angle of the side frame increases, there is no problem in the manner of rigidly connecting the battery pack and the longitudinal member with bolts, and according to this configuration, the longitudinal member and the battery pack are fastened with the bolts, whereby the structure can be simplified.

Further, in the battery mounting structure of the frame vehicle, each of the support members may be a rubber mount having flexibility around an axis in the vehicle front-rear direction.

Although a hard spring characteristic of several hundred N/mm is required in order to support the battery pack of several hundred kg, it is possible to have a soft spring characteristic around the axis in the vehicle front-rear direction while having a hard spring characteristic in the up-down direction. According to this configuration, by supporting the battery pack with the rubber mount having flexibility around the axis in the vehicle front-rear direction, the displacement of the battery pack around the axis in the vehicle front-rear direction can be absorbed by the rubber mount.

As described above, with the battery mounting structure of the frame vehicle according to the present disclosure, it is possible to suppress the failure of the battery even when the torsion angle of the side frame supporting the battery pack increases.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the drawings, the arrow Fw indicates the front side in the vehicle front-rear direction, the arrow Lf indicates the left side in the vehicle width direction, and the arrow Up indicates the upper side.

Embodiment 1

Frame Car

Figure 1:
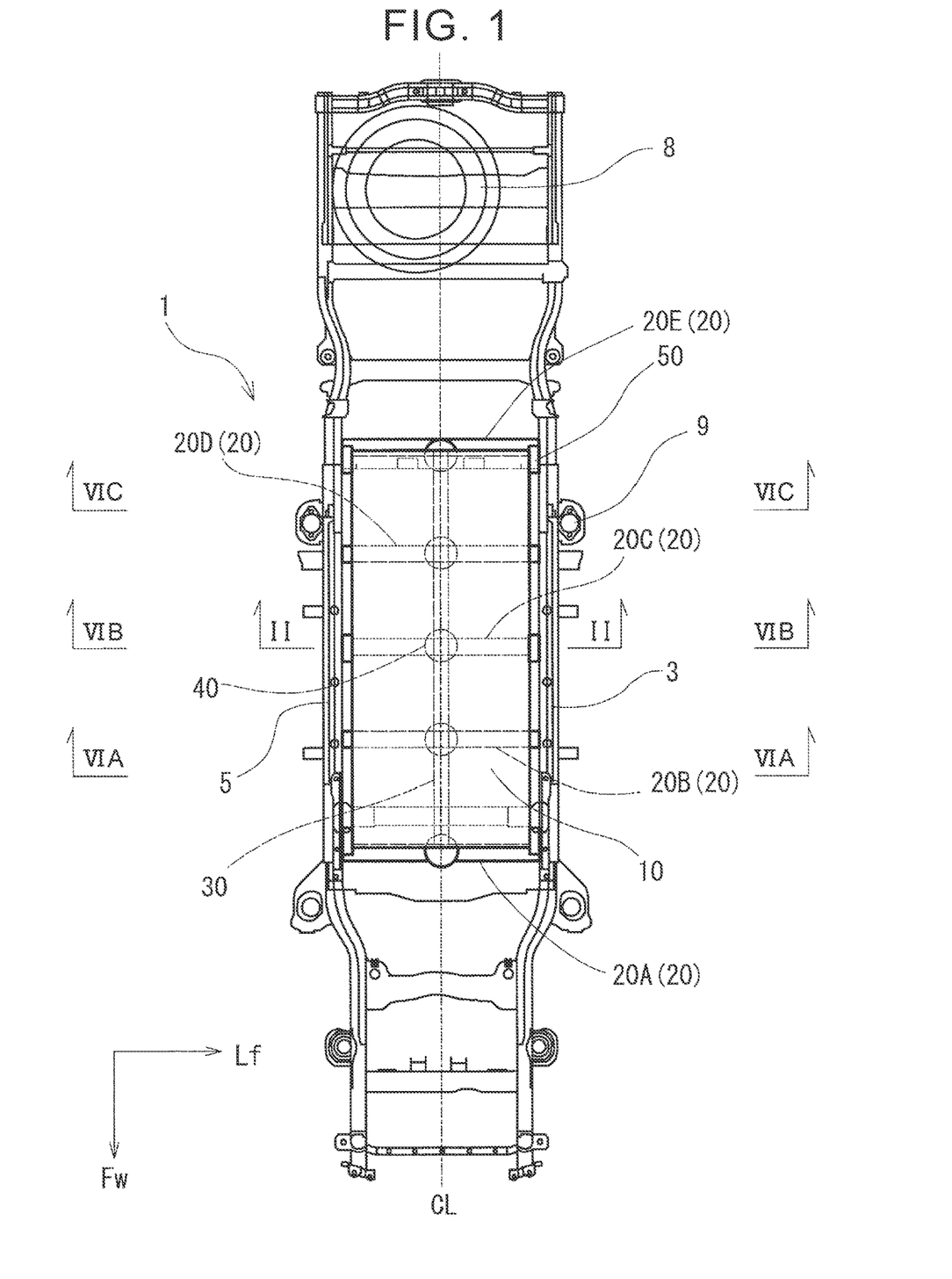
FIG. 1 is a plan view schematically showing a skeleton of a vehicle to which a battery mounting structure according to a first embodiment of the present disclosure is applied.
Figure 2:
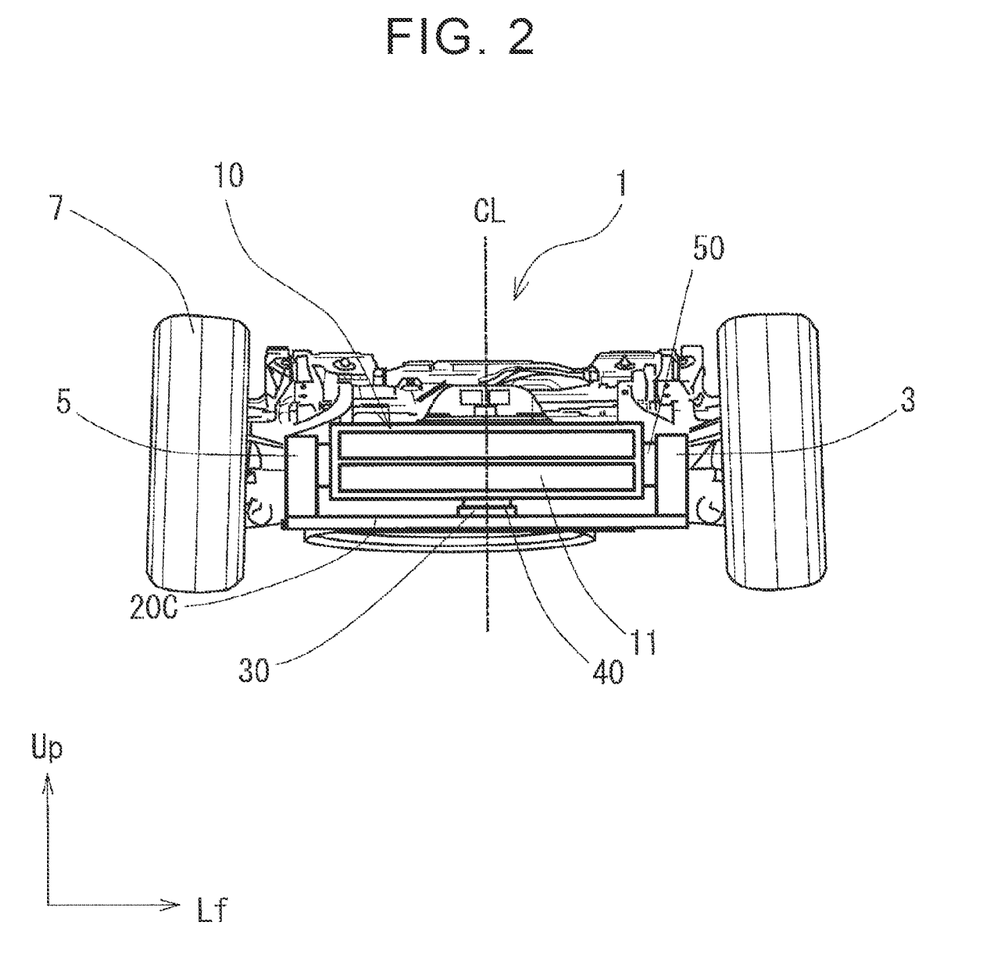
FIG. 2 is a cross-sectional view taken along II-II line of FIG. 1.

FIG. 1 is a plan view schematically showing a skeleton of a vehicle 1 to which a battery mounting structure according to the present embodiment is applied. FIG. 2 is a cross-sectional view taken along II-II line of FIG. 1. In FIG. 1, the right and left wheels 7 are not shown. As shown in FIG. 1, the vehicle 1 includes a pair of right and left side frames 3 and 5 extending in the vehicle front-rear direction.

The vehicle 1 is configured as a electrified vehicle that is driven by an electric motor (not shown) using the battery 11 as a main power source, and is configured as a so-called frame vehicle in which a body (cabin) (not shown) is mounted on the side frames 3 and 5 via a cab mount (not shown) attached to a plurality of mount attachment portions 9 fixed to the side frames 3 and 5. Therefore, in the following description, the vehicle 1 is also referred to as a "frame vehicle 1".

In this frame vehicle 1, a battery pack 10 in which a battery 11 is systematized and assembled into a case adopts a battery mounting structure that is supported by a pair of right and left side frames 3 and 5, as shown in FIGS. 1 and 2.

Battery Mounting Structure

Next, a battery mounting structure in the frame vehicle 1 will be described in detail. Prior to that, in order to facilitate understanding of the present embodiment, a battery mounting structure of a conventional frame vehicle will be described.

Figure 11A:
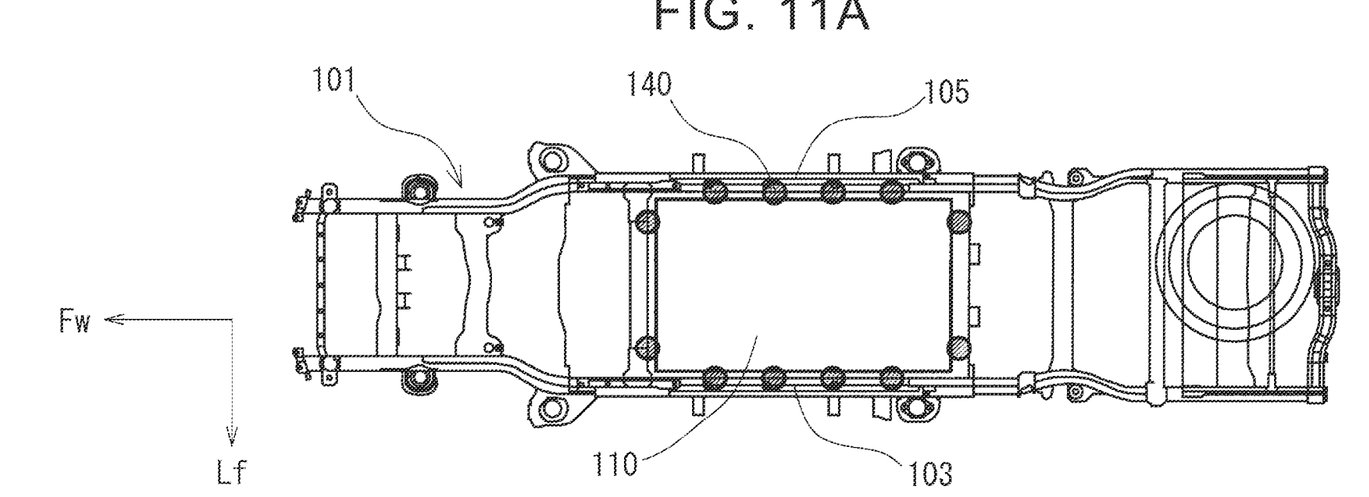
FIG. 11A is a diagram schematically illustrating a battery mounting structure of a conventional frame vehicle.
Figure 11B:
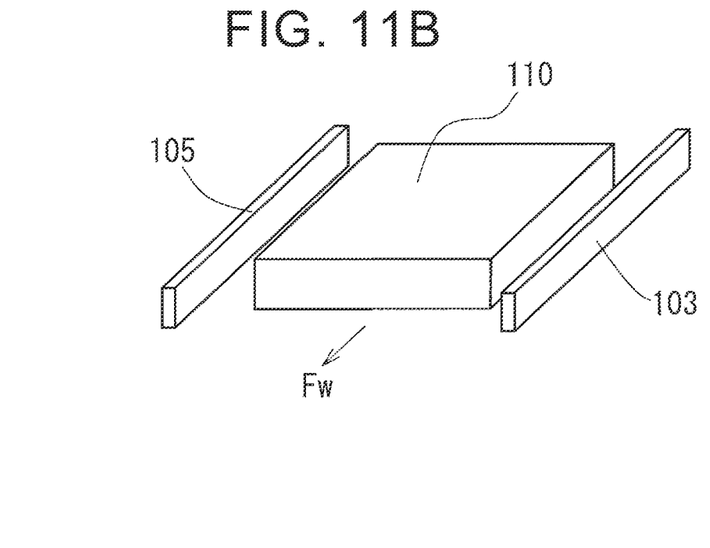
FIG. 11B is a diagram schematically illustrating a battery mounting structure of a conventional frame vehicle.
Figure 11C:
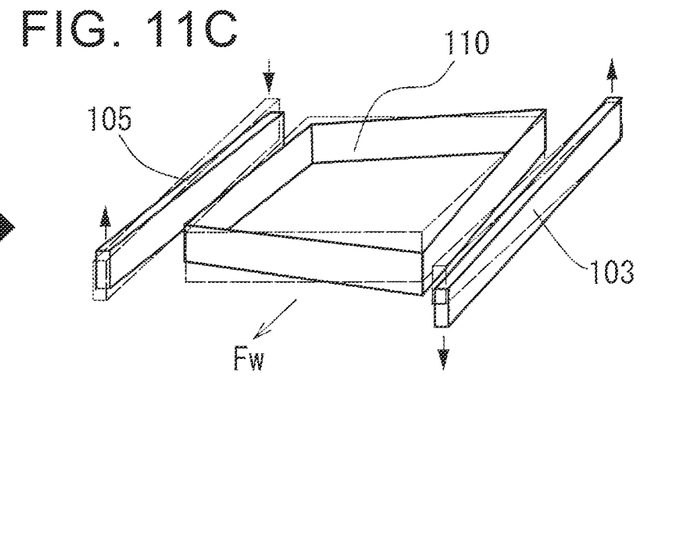
FIG. 11C is a diagram schematically illustrating a battery mounting structure of a conventional frame vehicle.

FIGS. 11A, 11B, and 11C are diagrams schematically illustrating a battery mounting structure of a conventional frame vehicle 101. In the conventional frame vehicle 101, as shown in FIG. 11A, the battery pack 110 is simply fastened to the side frame 103,105 via the frame support point 140. However, such a battery mounting structure may have the following problems.

That is, since the side frame and the body are integrated, unlike the monocoque vehicle having high torsional rigidity, the side frame 103,105 and the body are separated from each other in the frame vehicle 101, so that the torsional rigidity of only the side frame 103,105 is relatively low. Therefore, in the frame vehicle 101, when traveling (such as when riding over a level difference), as shown in FIG. 11B, for example, as shown in FIG. 11C, the front end of the left side frame 103 is lowered and the rear end is raised, while the front end of the right side frame 105 is raised and the rear end is lowered, when the torsion angle of the side frame 103,105 is increased, the battery pack 110 to be fastened to the side frame 103,105 is greatly twisted, there is a possibility that the battery is damaged.

Here, in order to absorb the torsion of the side frame 103,105, it is conceivable that the frame support point 140 is constituted by a rubber mount, and the battery pack 110 is supported by the side frame 103,105 via the rubber mount. However, in order to support the battery pack 110 of several hundred kg, a hard spring characteristic of several hundred N/mm is required, and in a rubber mount having such a hard spring characteristic, it is difficult to absorb torsion (up and down displacement) of the side frame 103,105.

Therefore, in the battery mounting structure of the frame vehicle 1 according to the present embodiment, as shown in FIGS. 1 and 2, the battery pack 10 is supported by the longitudinal member 30 provided at an intermediate position between the pair of right and left side frames 3 and 5, which is most unlikely to be affected by the torsion angle of the pair of right and left side frames 3 and 5.

More specifically, the battery mounting structure of the present embodiment includes a plurality of (five in the example of FIG. 1) lateral members 20 (20A,20B,20C,20D, 20E), a longitudinal member 30, a support member 40, and a rubber bush 50.

The lateral members 20A,20B,20C,20D,20E are formed in a rectangular cross-section extending in the vehicle-width direction and made of, for example, metallic material. The lateral members 20A,20B,20C,20D,20E are bolted to the lower surfaces of the side frames 3 and 5, and are bridged over the pair of right and left side frames 3 and 5. These lateral members 20A,20B, . . . are bridged over the pair of right and left side frames 3 and 5 in the frame vehicle 1, and perform the same function as a cross member that supports a radiator (not shown), a spare tire 8, and the like.

Like the lateral member 20, the longitudinal member 30 is formed in a hollow rectangular cross-section made of metal, for example. The longitudinal member 30 is bolted, for example, to the upper surface of the lateral member 20 and is thereby supported by the side frames 3, 5 via a plurality of lateral members 20A,20B, . . . . More specifically, as shown in FIGS. 1 and 2, the longitudinal member 30 is supported by a plurality of lateral member 20A, 20B, . . . so as to extend in the vehicle front-rear direction at an intermediate position (on the vehicle center line CL) in the vehicle width direction of the pair of right and left side frames 3 and 5.

Figure 3A:
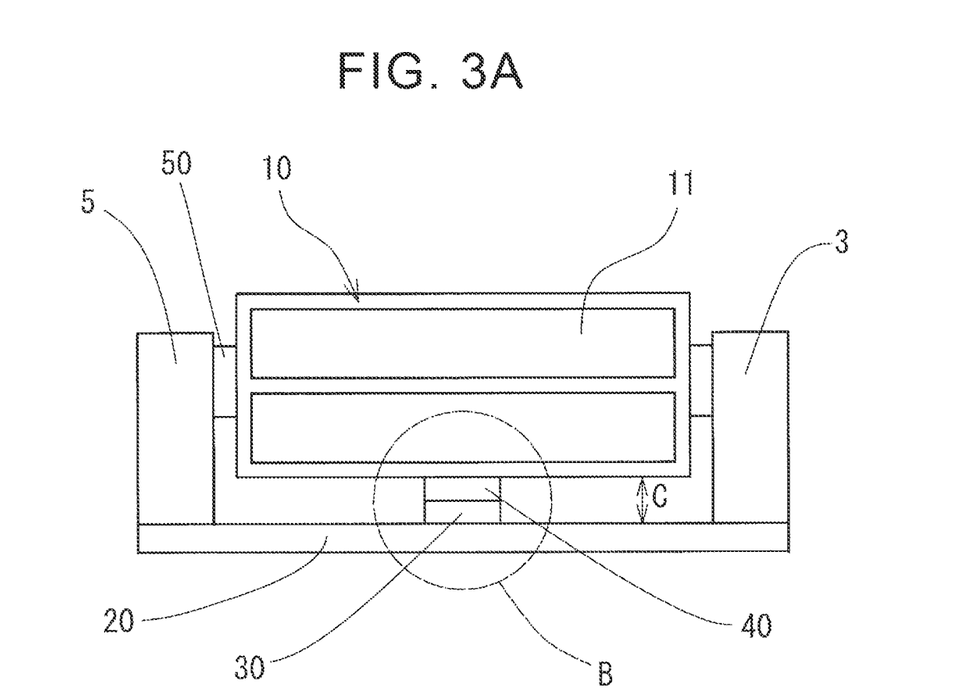
FIG. 3A is a diagram schematically illustrating an example of a support member.
Figure 3B:
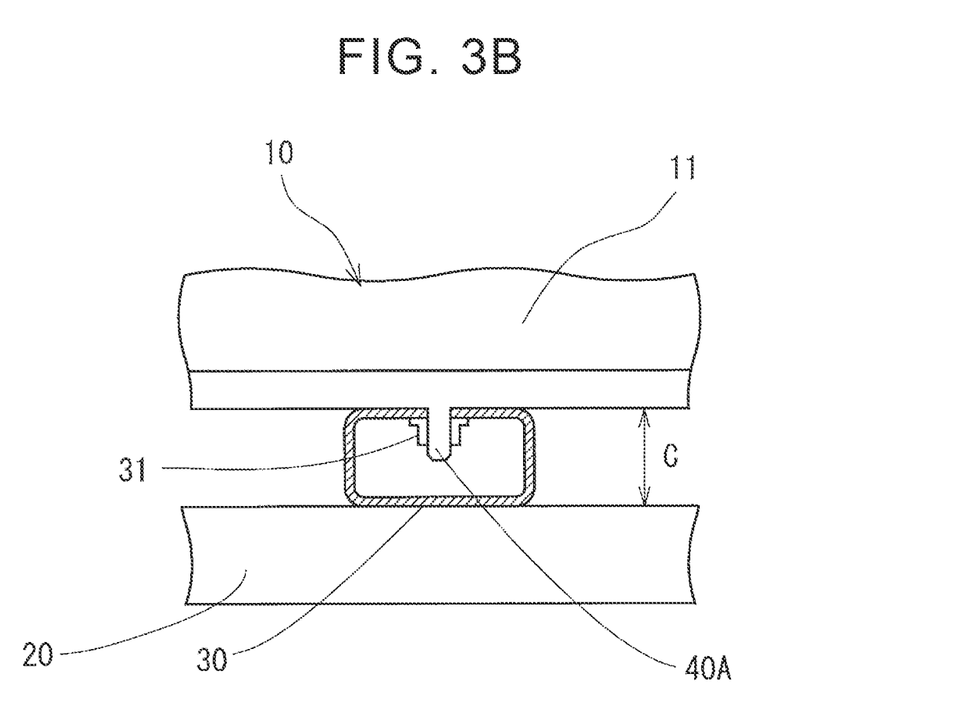
FIG. 3B is a detailed view of part B in the FIG. 3A.

FIG. 3A is a diagram schematically illustrating an example of a support member 40. FIG. 3B is a detailed view of part B in FIG. 3A. As shown in FIG. 1, a plurality of support members 40 (five in the example of FIG. 1) are provided on the longitudinal member 30 at intervals in the vehicle front-rear direction. As shown in FIG. 3A, these support members 40 support the battery pack 10 so that a gap C in the vertical direction is formed between the upper surface of the lateral member 20 and the lower surface of the battery pack 10. Note that, in FIG. 1, the support member 40 is provided at a position where the lateral member 20 and the longitudinal member 30 intersect with each other, but the present disclosure is not limited thereto as long as it is on the longitudinal member 30, and the support member 40 may be provided at any position in the vehicle front-rear direction.

In the embodiment shown in FIG. 3B, the support member 40 is formed of a bolt 40A. The bolt 40A is welded to the lower surface of the battery pack 10, for example, and is inserted into a bolt hole formed in the upper surface of the longitudinal member 30, and is tightened by the nut 31, so that a gap C in the vertical direction is formed between the upper surface of the lateral member 20 and the lower surface of the battery pack 10, thereby connecting the lower surface of the battery pack 10 and the upper surface of the longitudinal member 30.

Figure 4A:
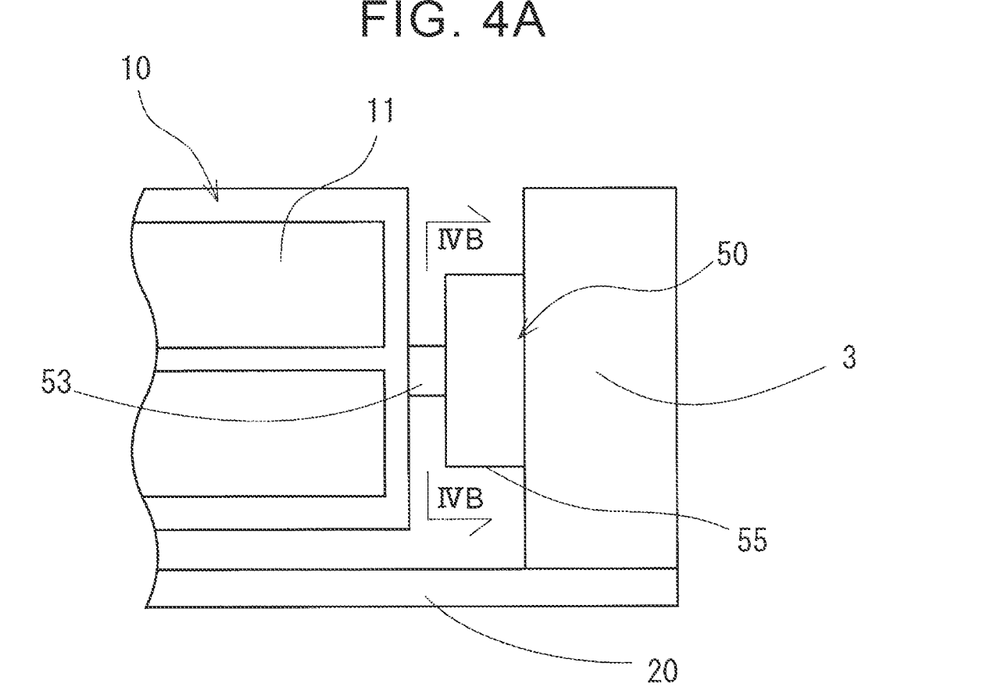
FIG. 4A is a schematic view of a rubber bush.
Figure 4B:
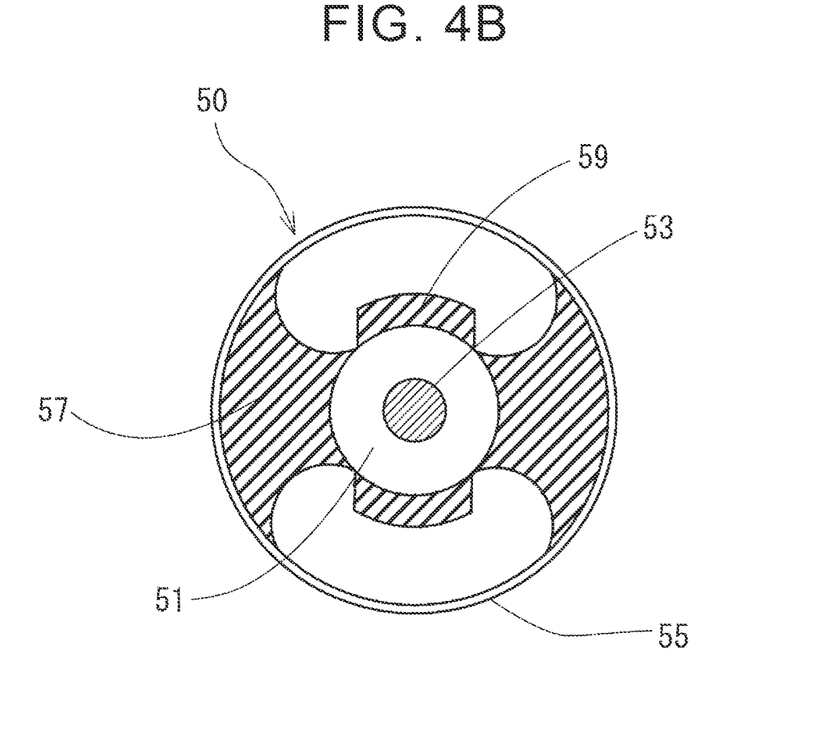
FIG. 4B is a cross-sectional view taken along IVB-IVB line of FIG. 4A.

FIG. 4A is a diagram schematically illustrating a rubber bush 50. FIG. 4B is a cross-sectional view taken along IVB-IVB line of FIG. 4A. In FIG. 4B, the vibration absorbing rubber 57 and the stopper rubber 59 are not cross-sectional, but are hatched to make the drawing easy to see. As shown in FIG. 4B, the rubber bush 50 includes a first shaft portion 51, a second shaft portion 53, a cylindrical portion 55, a vibration absorbing rubber 57, and a stopper rubber 59.

The first shaft portion 51 is a metal member formed in a columnar shape having a relatively large diameter. The second shaft portion 53 is a metal member formed in a columnar shape having a relatively small diameter. The first shaft portion 51 and the second shaft portion 53 are connected to each other in the axial direction via a step portion. The first shaft portion 51 is inserted into the cylindrical portion 55, and the outer peripheral surface of the first shaft portion 51 and the inner peripheral surface of the cylindrical portion 55 are elastically connected via the vibration absorbing rubber 57 as shown in FIG. 4B. A stopper rubber 59 is provided on the outer peripheral surface of the first shaft portion 51 so as to be spaced apart from the inner peripheral surface of the cylindrical portion 55 in the cylindrical radial direction.

As shown in FIG. 4A, the distal end portion of the second shaft portion 53 is connected to the end portion of the battery pack 10, while the outer end portion of the cylindrical portion 55 is connected to the side surface of the side frame 3. Accordingly, the battery pack 10 is elastically connected to the side frame 3 via the rubber bush 50.

In the rubber bush 50 configured as described above, when the first shaft portion 51 is displaced relative to the cylindrical portion 55, in other words, when the battery pack 10 is displaced relative to the side frame 3, the stopper rubber 59 comes into contact with the cylindrical portion 55, thereby restricting the maximum movement amount of the battery pack 10 during traveling and preventing the hitting noise caused by the contact between the first shaft portion 51 and the cylindrical portion 55. Further, since the outer peripheral surface of the first shaft portion 51 and the inner peripheral surface of the cylindrical portion 55 are elastically connected via the vibration absorbing rubber 57, it is possible to control the resonance of the battery pack 10 by the input from the road surface.

In FIG. 1, a rubber bush 50 is provided at a position where the lateral member 20A,20C,20E is installed. However, the present disclosure is not limited thereto, and the rubber bush 50 may be provided at any position in the vehicle front-rear direction, and the number of the rubber bushes 50 is not limited to six.

Action and Effect

Figure 5:
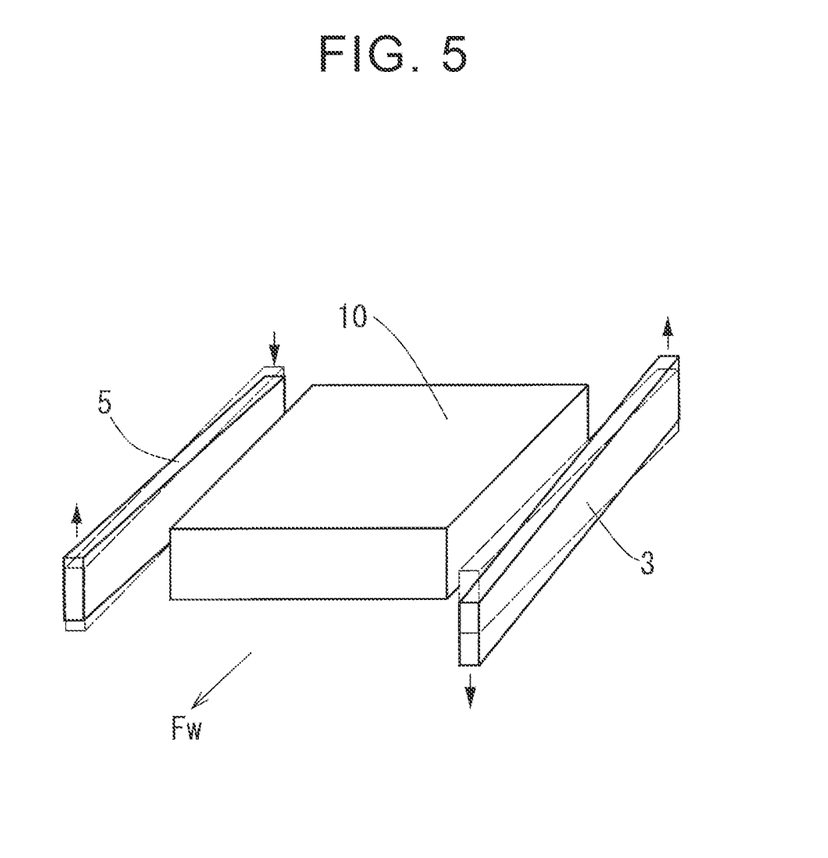
FIG. 5 is a perspective view schematically showing the behavior of the battery pack when the torsion angle of the side frame increases.
Figure 6A:
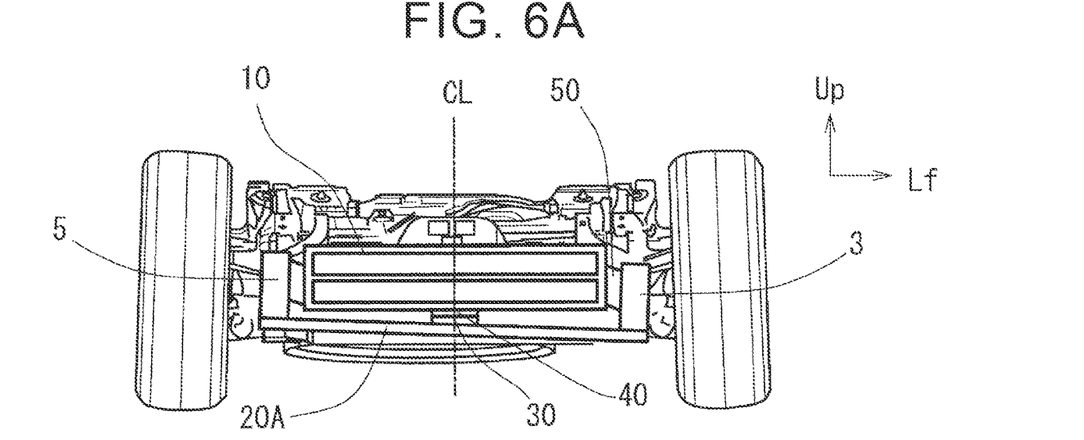
FIG. 6A is a diagram schematically showing the behavior of the battery pack when the torsion angle of the side frame becomes large, and is a cross-sectional view taken along the line of VIA-VIA of FIG. 1.
Figure 6B:
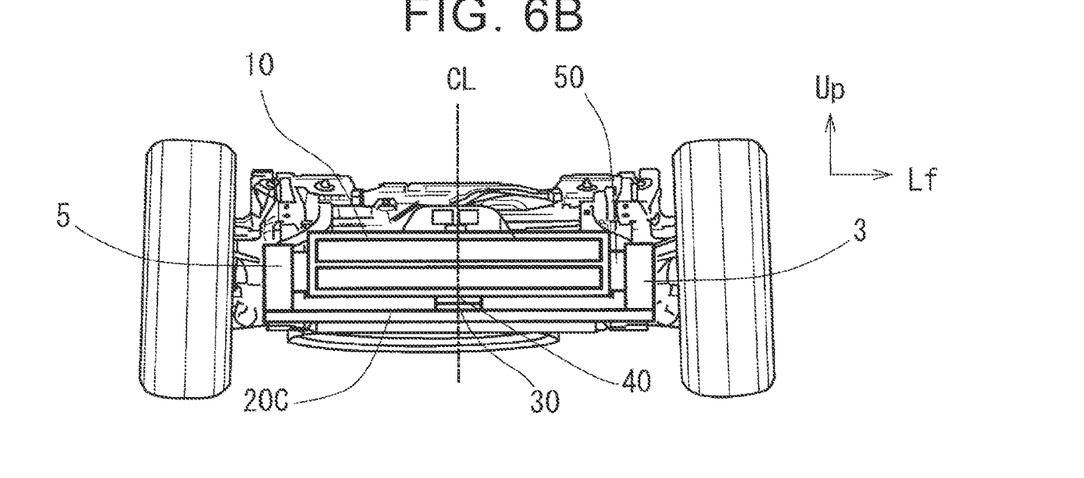
FIG. 6B is a diagram schematically showing the behavior of the battery pack when the torsion angle of the side frame becomes large, and is a cross-sectional view taken along the line of VIB-VIB of FIG. 1.
Figure 6C:
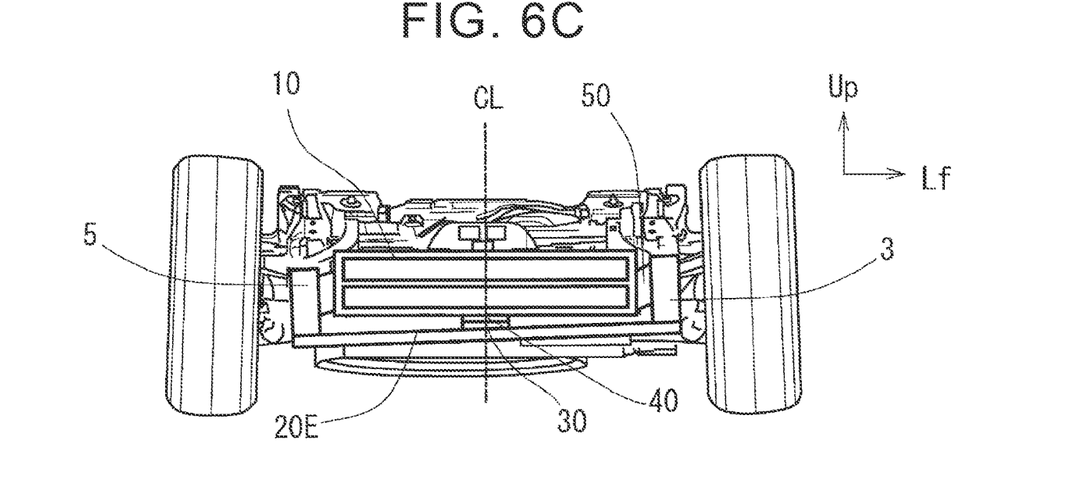
FIG. 6C is a diagram schematically showing the behavior of the battery pack when the torsion angle of the side frame becomes large, and is a cross-sectional view taken along the line of VIC-VIC of FIG. 1.

FIG. 5 is a perspective view schematically showing the behavior of the battery pack 10 when the torsion angle of the side frames 3 and 5 increases. Further, FIGS. 6A, 6B, and 6C are diagrams schematically illustrating the behavior of the battery pack 10 when the torsion angles of the side frames 3 and 5 are increased. FIG. 6A is a cross-sectional view taken along a VIA-VIA line of FIG. 1. FIG. 6B is a cross-sectional view taken along a VIB-VIB line of FIG. 1. FIG. 6C is a cross-sectional view taken along a VIC-VIC line of FIG. 1.

For example, as shown in FIG. 5, the front end of the left side frame 3 is lowered and the rear end is raised, while the front end of the right side frame 5 is raised and the rear end is lowered, even if the torsion angle of the side frames 3 and 5 is increased, in the battery mounting structure of the present embodiment, the battery pack 10 is hardly displaced.

More specifically, as shown in FIG. 6A, when the left side frame 3 is lowered and the right side frame 5 is raised, the lateral member 20A is greatly inclined leftward downward. However, even if the lateral member 20A is greatly inclined downward to the left, the vertical displacement of the central portion of the lateral member 20A, which is the intermediate position (vehicle center line CL) in the vehicle width direction of the pair of right and left side frames 3 and 5, is the mean of the displacements of the right and left side frames 3 and 5. Therefore, even when the torsion angles of the side frames 3 and 5 are increased, the central portion of the lateral member 20A is hardly displaced. Similarly, the lateral member 20B adjoining the lateral member 20A also tilts leftward, but there is little displacement in the center of the lateral member 20B.

On the other hand, as shown in FIG. 6C, when the left side frame 3 is raised and the right side frame 5 is lowered, the lateral member 20E is greatly inclined downward to the right. However, even if the lateral member 20E is greatly inclined downward to the right, the lateral member 20E, which is an intermediate position in the vehicle width direction (vehicle center line CL) of the pair of right and left side frames 3 and 5, is hardly displaced. Similarly, the lateral member 20D adjoining the lateral member 20E also tilts downward to the right, but there is little displacement in the center of the lateral member 20D.

Further, since the center portions of the side frames 3 and 5 in the vehicle-front-rear direction are hardly displaced, the lateral member 20C extending over the center portions is hardly displaced, as shown in FIG. 6B. It will therefore be appreciated that there is little displacement in the central part of the lateral member 20C.

As described above, since almost no displacement occurs in the central portion of the lateral member 20A,20B,20C, 20D,20E, in the battery mounting structure of the frame vehicle 1 according to the present embodiment, the longitudinal member 30 supported by the plurality of lateral member 20A,20B, . . . is hardly affected (no displacement occurs) even when the torsion angles of the side frames 3 and 5 increase so as to extend in the vehicle front-rear direction at the intermediate position (vehicle center line CL).

Thus, since the battery pack 10 is supported by the plurality of support members 40 provided in the longitudinal member 30, it is hardly affected even when the torsion angle of the side frames 3 and 5 increases. Further, since the support member 40 supports the battery pack 10 so that a gap C in the up-down direction is formed between each of the lateral members 20A,20B, . . . , even if each of the lateral members 20A,20B, . . . is greatly inclined, the battery pack 10 is not affected. Therefore, even when the torsion angle of the side frames 3 and 5 is increased, the battery pack 10 is not significantly twisted, and thus the failure of the battery 11 can be suppressed.

When viewed in a cross section orthogonal to the vehicle front-rear direction, the battery pack 10 is supported at a point by the support member 40 in the central portion of the lateral member 20, and therefore, it is considered that the battery pack is unstable. However, since the battery pack 10 is connected to the side frames 3 and 5 via the rubber bush 50, the shaking of the battery pack 10 can be restricted by the rubber bush 50.

In addition, in the battery mounting structure of the present embodiment, the support member 40 is constituted by a bolt 40A that fastens the longitudinal member 30 and the battery pack 10. However, as described above, the battery pack 10 is supported by the longitudinal member 30 that is hardly affected even when the torsion angle of the side frames 3 and 5 is increased, so that there is no problem even in a mode in which the battery pack 10 and the longitudinal member 30 are rigidly connected by a bolt 40A, and it is possible to simplify the construction by bolting the longitudinal member 30 and the battery pack 10.

Embodiment 2

The present embodiment is different from the first embodiment in that the support member 40 is formed of a rubber mount. Hereinafter, differences from the first embodiment will be mainly described.

Figure 7A:
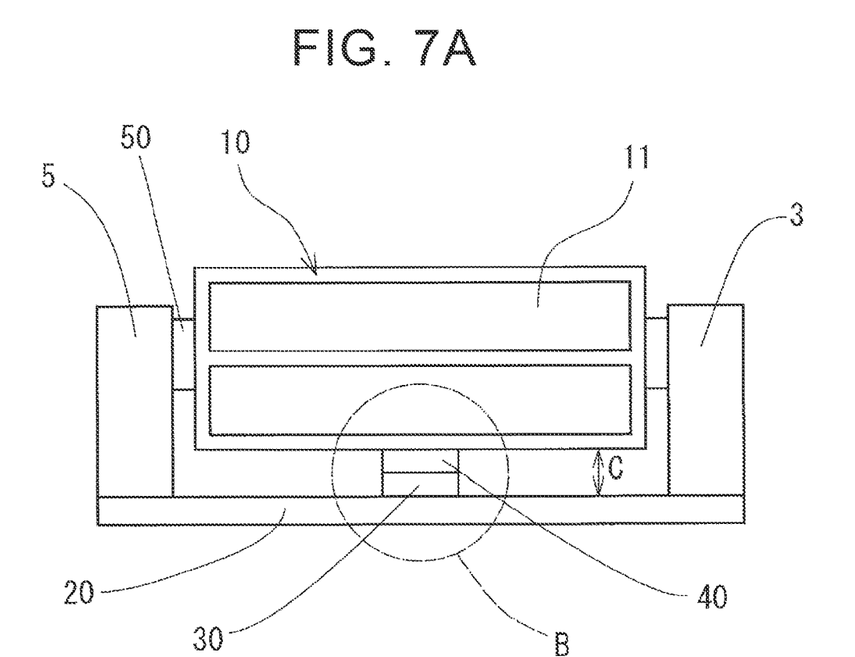
FIG. 7A is a diagram schematically illustrating a support member according to a second embodiment of the present disclosure.
Figure 7B:
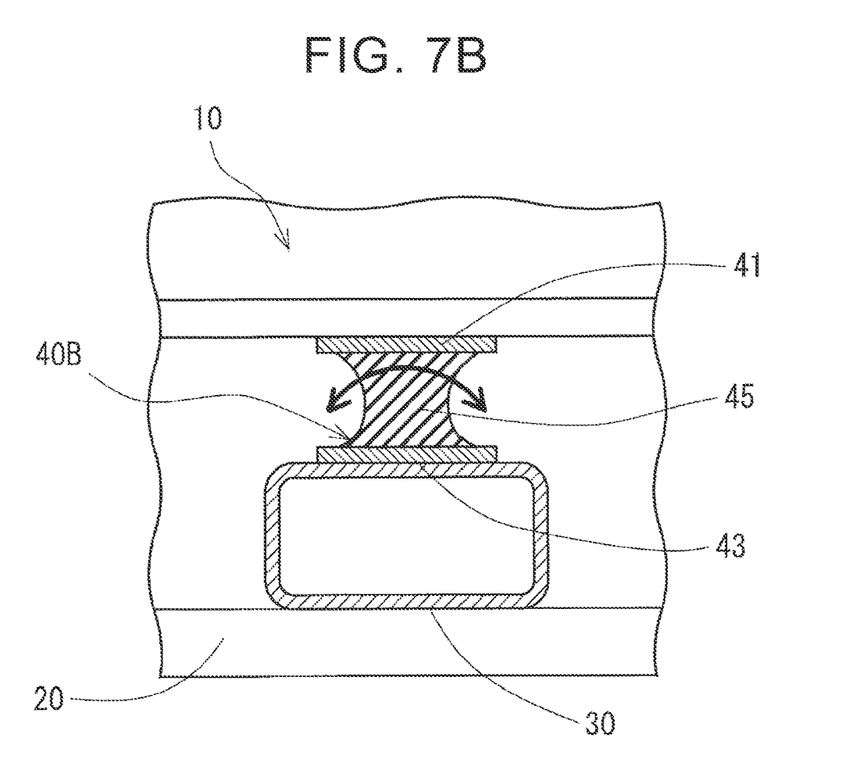
FIG. 7B is a detailed view of part B in the FIG. 7A.

FIG. 7A is a diagram schematically illustrating an example of a support member 40 according to the present embodiment. FIG. 7B is a detailed view of part B in the FIG. 7A. In the present embodiment, as shown in FIG. 7B, the support member 40 is made of a rubber mount 40B. The rubber mount 40B includes a metallic upper plate 41 and a lower plate 43, and a vibration isolating rubber 45 that connects the upper and lower plates 41 and 43 to each other. The upper plate 41 is attached to the lower surface of the battery pack 10 by welding or the like. On the other hand, the lower plate 43 is attached to the upper surface of the longitudinal member 30 by welding or the like.

Since the vibration isolating rubber 45 supports the battery pack 10 of several hundred kg, the vibration isolator has a stiff spring property of several hundred N/mm in the up-down direction, but has flexibility around the longitudinal axis of the vehicle (see the bold arrow in FIG. 7B). Therefore, the rubber mount 40B can absorb rotational displacement of the battery pack 10 while supporting the battery pack 10 of several hundred kg.

Action and Effect

According to the present embodiment, even when the torsion angles of the side frames 3 and 5 supporting the battery pack 10 are increased, not only the failure of the battery 11 can be suppressed, but also the displacement of the battery pack 10 about the vehicle longitudinal axis can be absorbed by the rubber mount 40B.

Modifications

In this modification, the mounting position of the rubber bush 50 is different from that of the first and second embodiments. Hereinafter, differences from the first and second embodiments will be mainly described.

Figure 8:
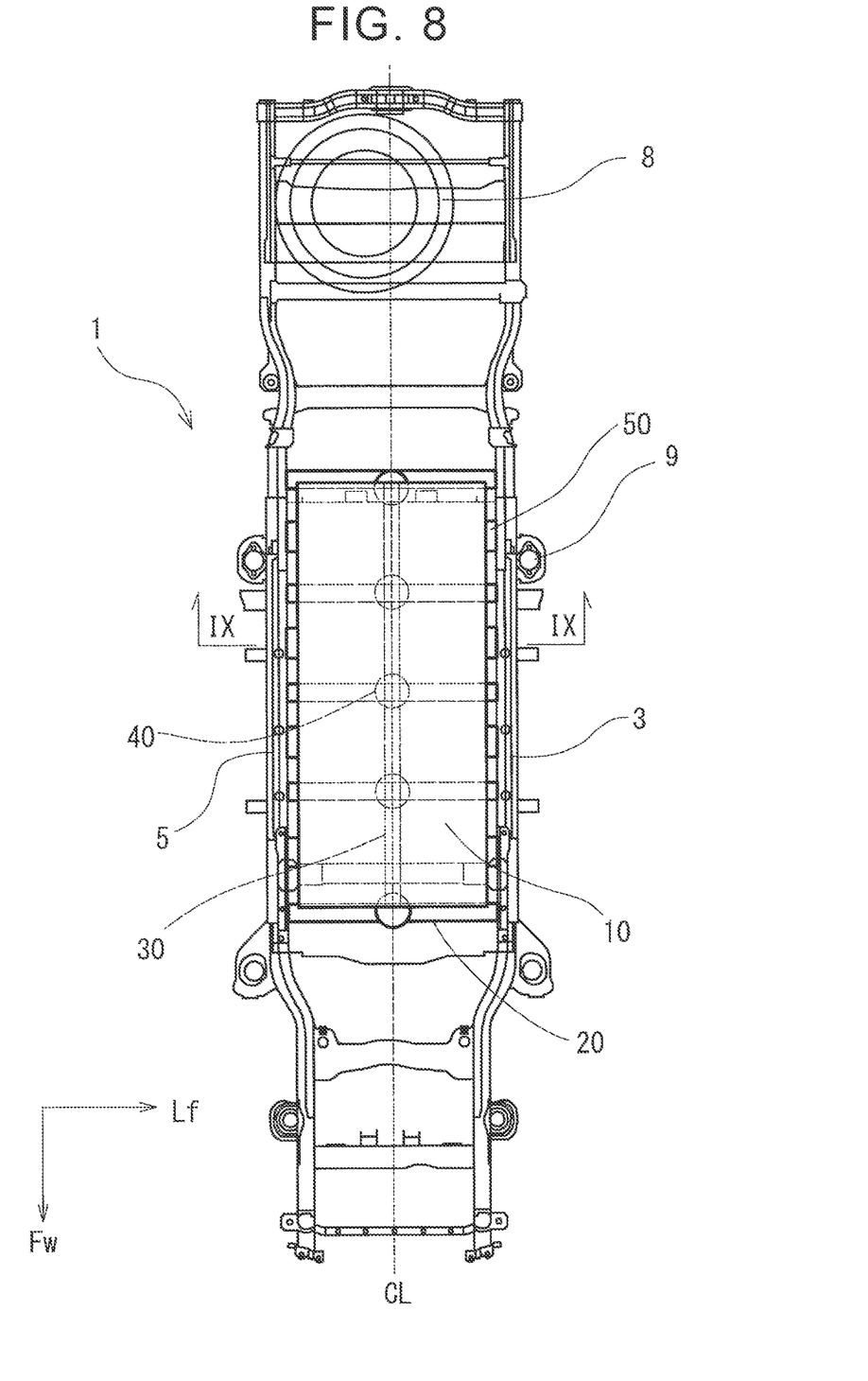
FIG. 8 is a plan view schematically showing a battery mounting structure according to a modification of the present disclosure.
Figure 9:
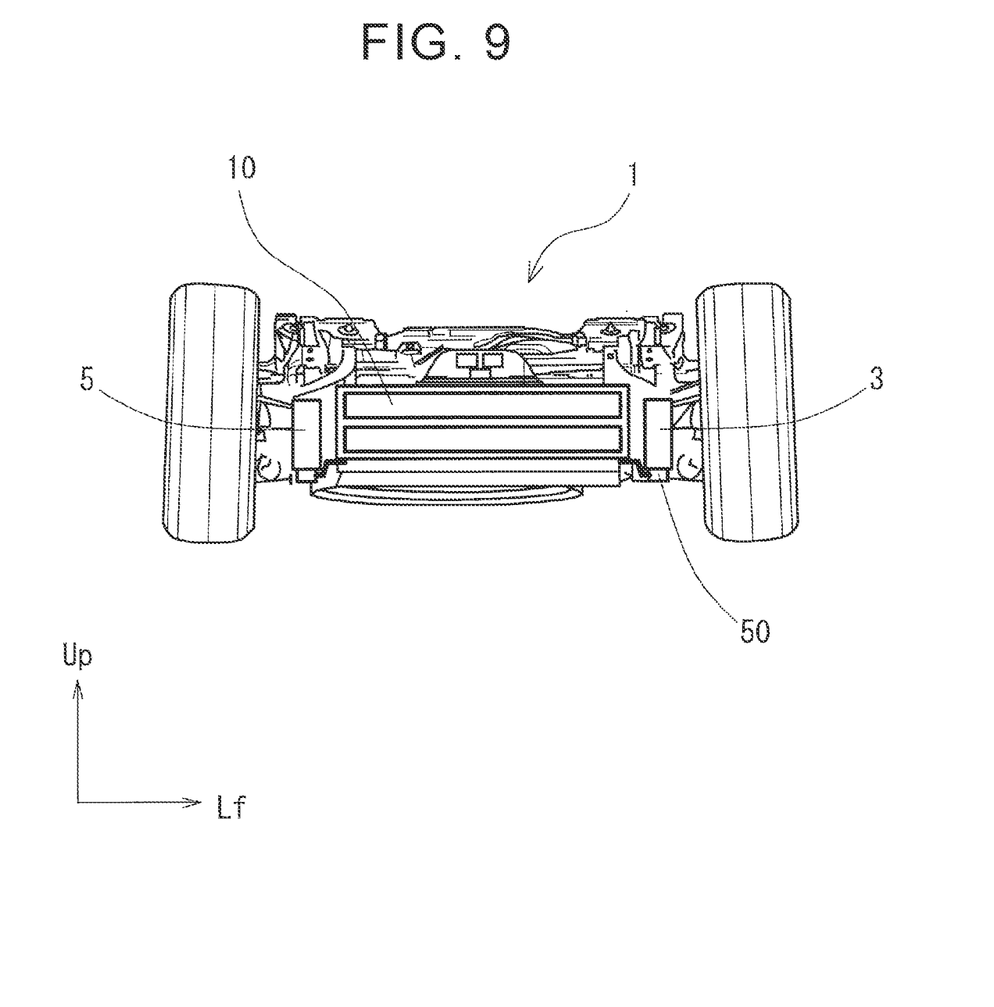
FIG. 9 is a cross-sectional view taken along IX-IX line of FIG. 8.

FIG. 8 is a plan view schematically showing a battery mounting structure according to a modification of the present disclosure. FIG. 9 is a cross-sectional view taken along IX-IX line of FIG. 8. Although the battery mounting structure according to the modification of the present disclosure includes eight rubber bushes 50, as shown in FIG. 8, since the rubber bushes 50 are provided at positions different from the positions where the lateral members 20 are installed, as shown in FIG. 9, the rubber bushes 50 can be set in the lower portions of the side frames 3 and 5 without interfering with the lateral members 20.

As described above, according to the present modification, it is possible to increase the degree of freedom in the installation layout of the rubber bush 50 in the side frames 3 and 5 with a simple configuration in which the rubber bush 50 is provided at a position different from the position where the lateral member 20 is installed.

Other Embodiments

The present disclosure is not limited to the embodiments, but may be embodied in various other forms without departing from the spirit or essential characteristics thereof.

Figure 10:
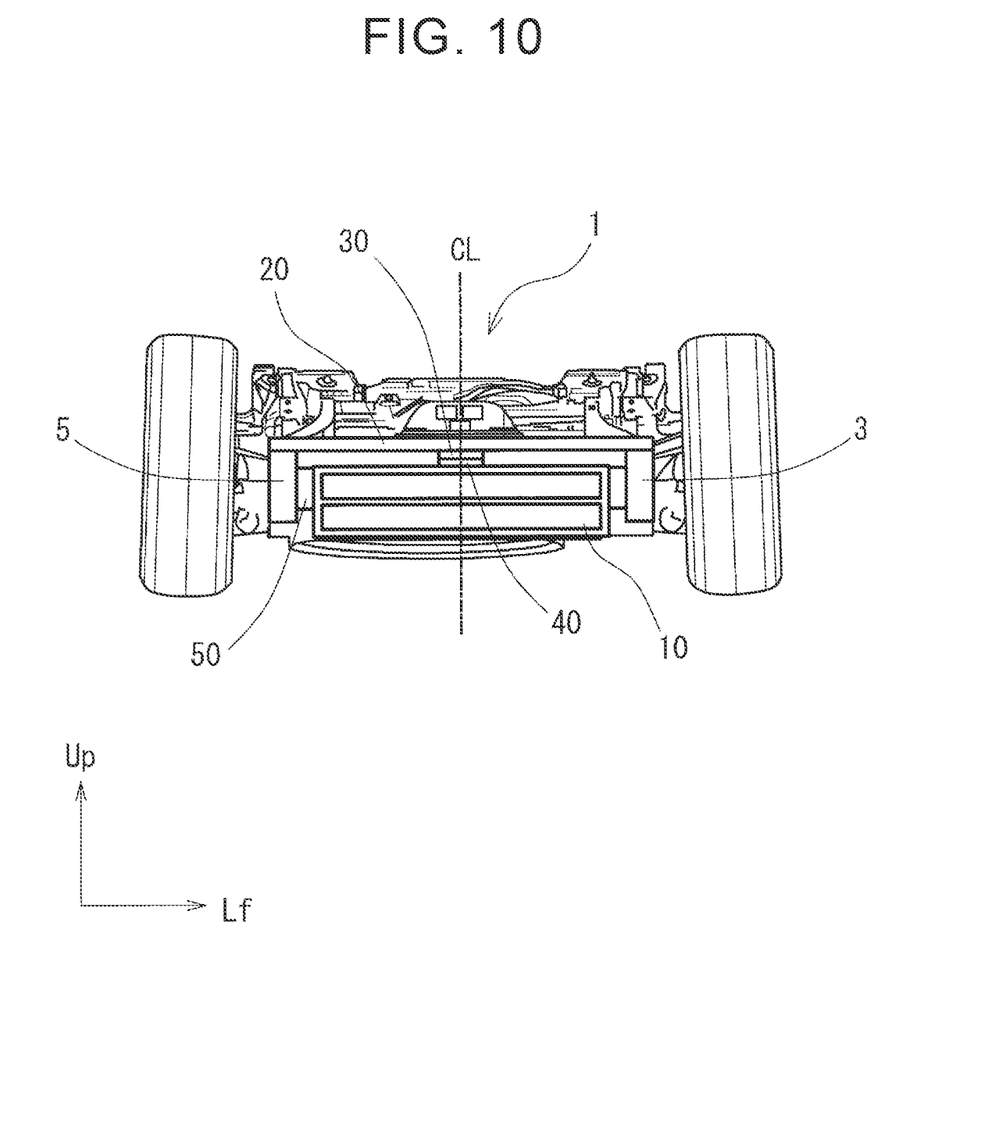
FIG. 10 is a cross-sectional view schematically illustrating a battery mounting structure according to another embodiment.

In each of the above-described embodiments, the lateral members 20 are bolted to the lower surfaces of the side frames 3 and 5, thereby extending over the pair of right and left side frames 3 and 5. However, the present disclosure is not limited thereto, and, for example, as shown in FIG. 10, the lateral member 20 may be stretched over the pair of left and right side frames 3 and 5 by bolting to the upper surfaces of the side frames 3 and 5.

Thus, the above-described embodiments are merely illustrative in all respects, and should not be construed as limiting. Furthermore, all variations and modifications falling within the equivalent scope of the claims are within the scope of the disclosure.

The present disclosure can suppress the failure of the battery due to the torsion even when the torsion angle of the side frame is increased, and thus is extremely useful when applied to a battery mounting structure of a frame vehicle that supports the battery pack by the side frame.

What is claimed is:

1. A battery mounting structure of a frame vehicle in which a battery pack is supported by a pair of right and left side frames that is provided in the frame vehicle and that extends in a vehicle front-rear direction, the battery mounting structure comprising:
    a plurality of lateral members extending in a vehicle width direction and extending across the right and left side frames;
    a longitudinal member supported by the lateral members so as to extend in the vehicle front-rear direction at an intermediate position between the right and left side frames in the vehicle width direction; and
    a plurality of support members that is provided on the longitudinal member at intervals in the vehicle front-rear direction and that supports the battery pack such that gaps in an up-down direction are provided between the lateral members and the battery pack, wherein the battery pack is connected to the right and left side frames via a rubber bush.

2. The battery mounting structure of the frame vehicle according to claim 1, wherein each of the support members is a bolt for fastening the longitudinal member and the battery pack.

3. The battery mounting structure of the frame vehicle according to claim 1, wherein each of the support members is a rubber mount having flexibility around an axis in the vehicle front-rear direction.

* * * * *